(12) United States Patent
Pini

(10) Patent No.: US 7,122,749 B2
(45) Date of Patent: Oct. 17, 2006

(54) LOCKING DEVICE

(75) Inventor: Belisario Pini, Florence (IT)

(73) Assignee: Verda S.r.l, (IT)

( * ) Notice: Subject to any disclaimer, the term of this patent is extended or adjusted under 35 U.S.C. 154(b) by 0 days.

(21) Appl. No.: 11/007,815

(22) Filed: Dec. 8, 2004

(65) Prior Publication Data

US 2006/0131073 A1    Jun. 22, 2006

(51) Int. Cl.
*H02G 3/18* (2006.01)
(52) U.S. Cl. ............... 174/650; 174/659; 174/662; 174/153 G; 16/2.1; 16/2.2; 24/712.1
(58) Field of Classification Search ............... 174/65 R, 174/65 G, 153 G, 152 G, 152 R, 135, 82, 174/83, 74 A, 154, 155, 156; 16/2.1, 2.2; 248/56, 68.1, 62, 74.2; 439/604, 587, 274, 439/275; 24/712.1, 712.3, 712.5, 115 G, 24/271
See application file for complete search history.

(56) References Cited

U.S. PATENT DOCUMENTS

| 5,607,323 | A | * | 3/1997 | Foster et al. ............... 174/65 R |
| 5,903,959 | A | * | 5/1999 | Leonardi ................... 24/712.1 |
| 6,583,357 | B1 | * | 6/2003 | Rubenstein et al. ...... 174/65 R |

* cited by examiner

*Primary Examiner*—Angel R. Estrada
(74) *Attorney, Agent, or Firm*—McGlew & Tuttle, PC

(57) ABSTRACT

A device for locking a plurality of threads includes a first and a second element each of which is provided with a central opening. The first and second elements cooperate to delimit a labyrinth passage for the threads to be locked. The second element is provided with two surfaces which are on opposite sides with respect to the respective central opening and is provided with two external wings which are united to the surface. The surfaces are united, on one side, with a bottom wall of the same second element from which they emerge, and, on the opposite side, with a corresponding external wing of the second element.

7 Claims, 4 Drawing Sheets

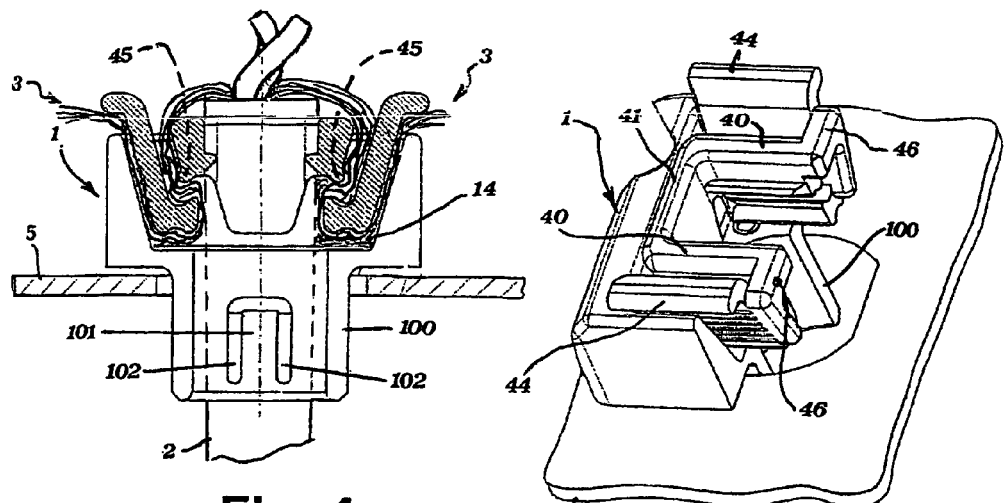
Fig. 4
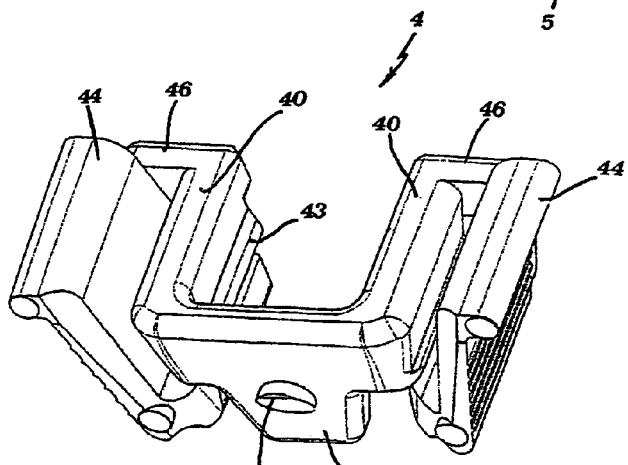
Fig. 5
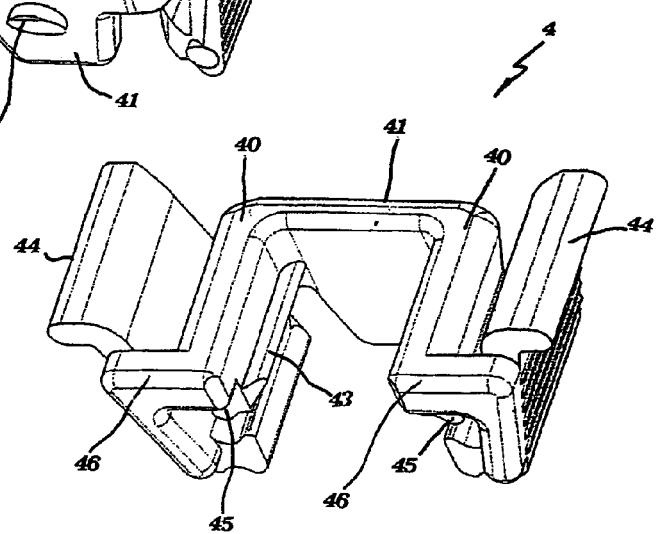
Fig. 6
Fig. 7

LOCKING DEVICE

FIELD OF THE INVENTION

The present invention relates to a locking device, especially, even if not exclusively, for electric cables provided with a textile resisting core, i.e. a core made up of a plurality of resisting non-conductive threads.

SUMMARY OF INVENTION

The main aim of the present invention is to propose a device allowing a simple, quick and safe locking of electric cables of the above-mentioned type.

This result has been achieved, according to the invention, by adopting the idea of making a device having the features as indicated in claim 1, further characteristics being set forth in the dependent claims.

The present device avoids the elongation of the core threads even if the cable is subject to a high tensile stress and it is safe, simple to be made, cheap and reliable even after a long operation time.

Furthermore, the present device is easy to use and it doesn't require any special training.

BRIEF DESCRIPTION OF THE DRAWINGS

These and other advantages and characteristics of the invention will be best understood by anyone skilled in the art from a reading of the following description in conjunction with the attached drawings given as a practical exemplification of the invention, but not to be considered in a limitative sense, wherein:

FIG. 4 is a further vertical section view of the device shown in FIGS. 1 and 2;

FIG. 5 is a perspective view of the assembly shown in FIGS. 1 and 2, wherein the electric cable is not illustrated and the first element (1) is partially sectioned to make the second element (4) better visible;

FIGS. 6 and 7 are two perspective views of the second element;

DETAILED DESCRIPTION OF THE INVENTION

Figure 1:
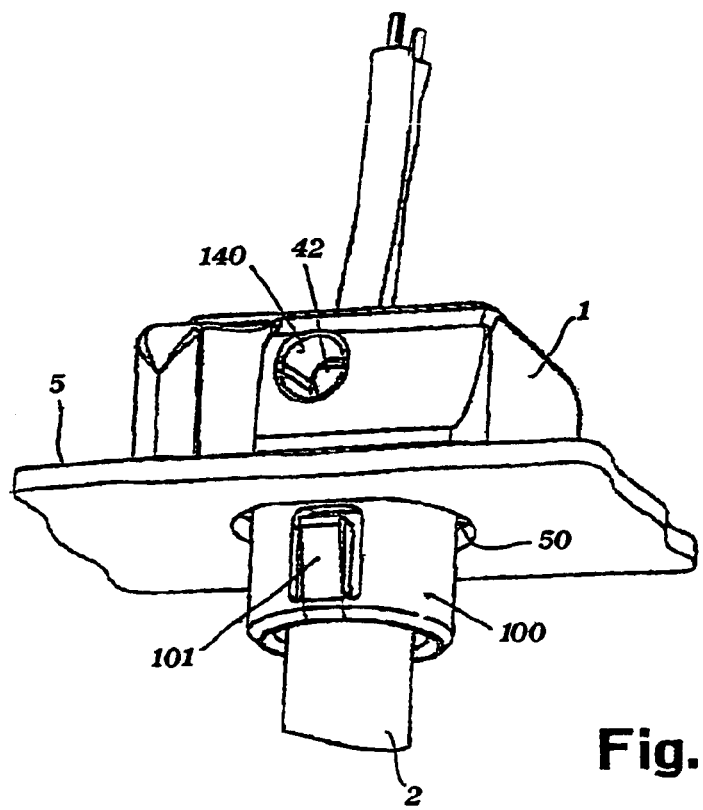
FIG. 1 is a schematic perspective view of a device according to the present invention.
Figure 3:
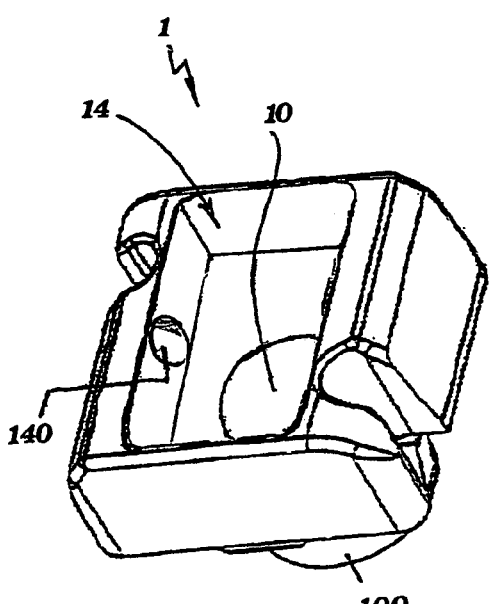
FIG. 3 is a perspective view of the first element of the device shown in FIGS. 1 and 2.
Figure 2:
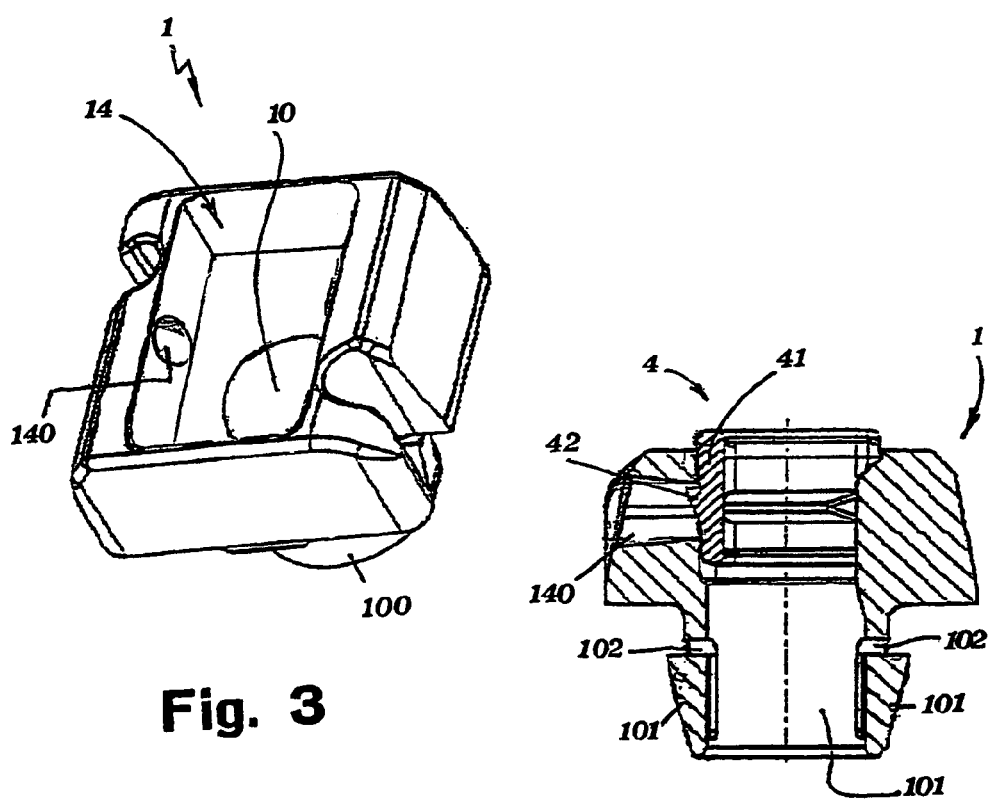
FIG. 2 is a cross section view of the device shown in FIG. 1, wherein the electric cable is not illustrated.
Figure 8:
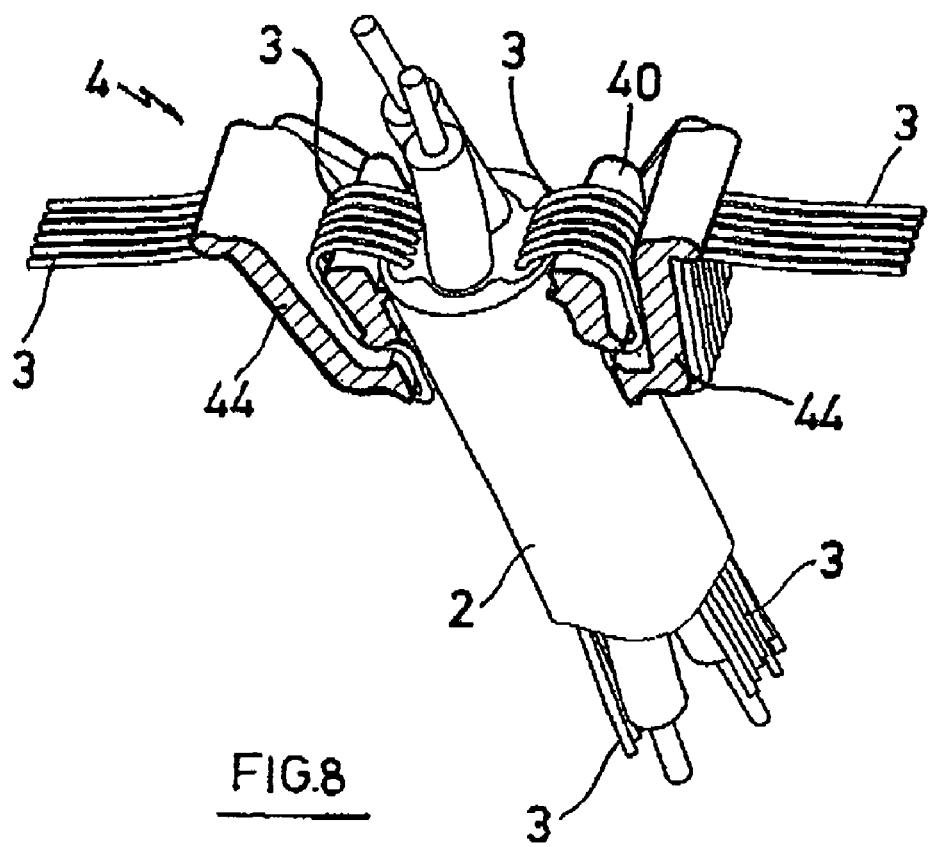
FIG. 8 is a perspective partially sectional view showing features shown in section in FIG. 4.
Figure 9:
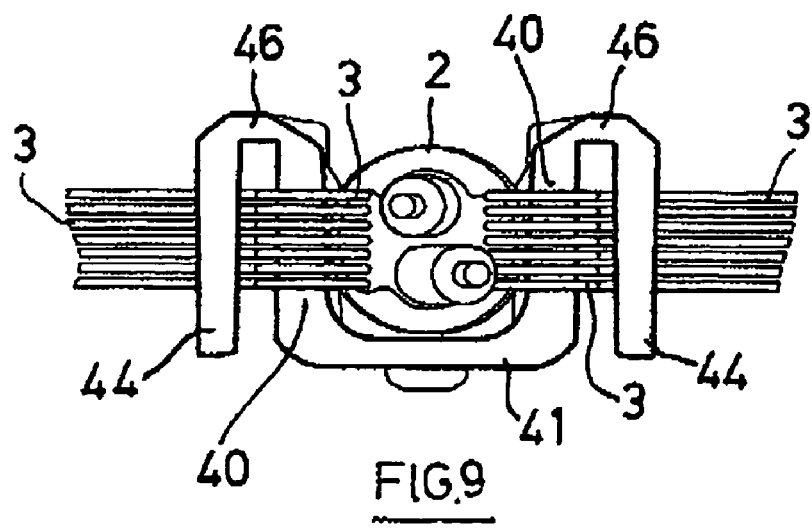
FIG. 9 it is a top planned view of the element shown in FIG. 8.
Figure 10:
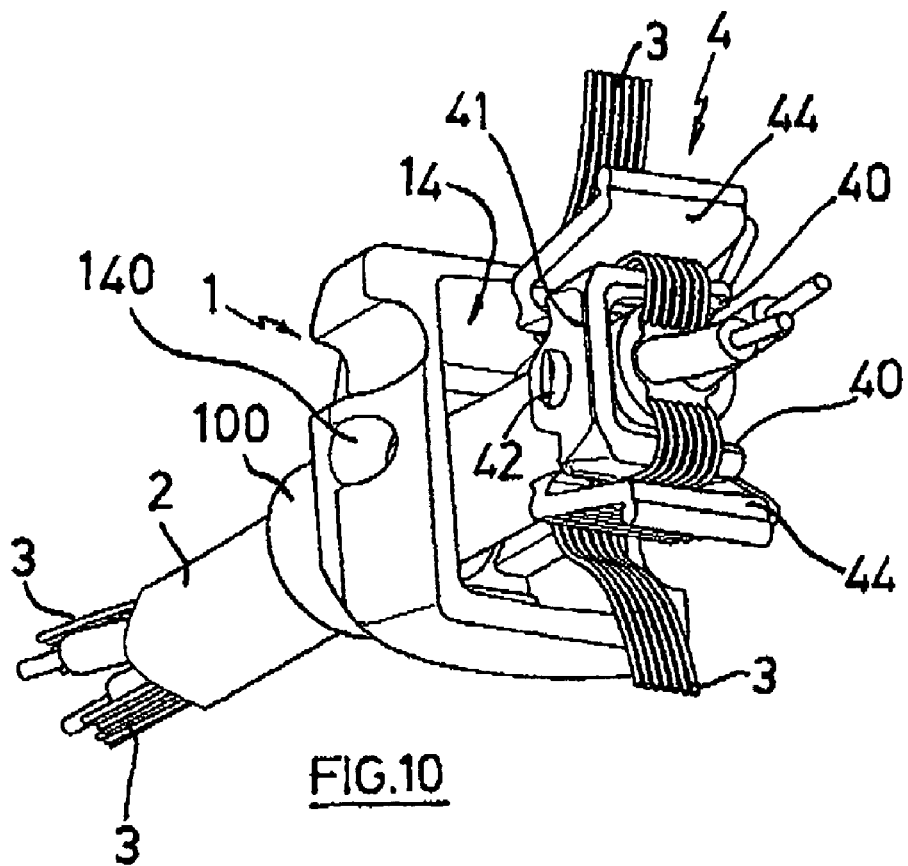
FIG. 10 is a perspective view showing an intermediate state of assembly.
Figure 11:
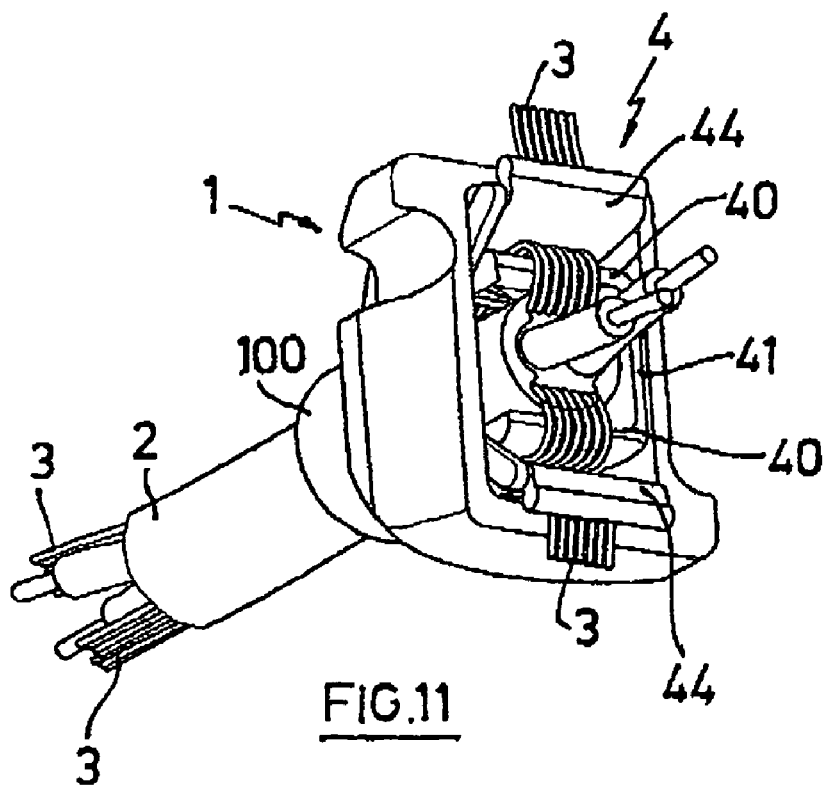
FIG. 11 is a perspective view showing the structure shown in FIG. 4.

Reduced to its basic structure and referring to the enclosed drawings, a device according to the present invention comprises:

a first element (1) which is provided with a central longitudinal opening (10) to allow the passage of an electric cable (2) of the type provided with a core made up of a plurality of resisting non-conductive threads (3);

a second element (4), apt to be positioned within a corresponding seat (14) of the first element (1) so as said cable (2) passes centrally through the latter, and provided with two inner lateral surfaces (40) apt to delimit, in cooperation with the inner surface of said seat (14), a labyrinth passage for the resisting threads (3) of the cable (2): said seat (14) being a part of the opening (10) which allows the cable (2) to pass through the first element (1).

Said first element (1) is provided, opposite to said seat (14), with a tubular tang shaped appendix (100) which, in turn, is provided with two radial appendixes (101) united to the same appendix only in correspondence of their respective bases, being surrounded by a reverse "U"-shaped cut (102).

In this way, said appendixes (102) are allowed to elastically bend towards the inside of the appendix (100). This is particularly useful when the device is connected with a support body (5) featuring an opening (50) through which the appendix (100) of the first element (1) may be positioned, so that the appendix (100) and the said seat (14) result on opposite sides with respect to the same support (5) as shown in FIG. 1, FIG. 4 and FIG. 5.

The opening for the passage of the cable (2) through the first element (1) is entirely within the appendix (100) and the seat (14) of the first element.

Said first element (1) is provided, in correspondence of said seat (14), with an opening (140) whose axis is substantially orthogonal to the opening for the cable (2); said second element (4) is provided, behind the bottom wall (41) from which said surfaces (40) emerge, with a teeth (42) destined to engage the cross opening (140) of the seat (14) when the first and the second element are assembled to lock the threads (3), so as to realize an irreversible connection of the second element with the first.

Said surfaces (40), between which the cable (2) is destined to pass, are united, on one side, with the wall (41) from which they emerge and, on the opposite side, with two external wings (44) of the same second element (4), so that, when seen in plant view, the second element (4) has a continuous shape with a central "C" shaped portion and two "C" side portions which are on opposite sides with respect to the central portion and 180° turned with respect to the latter.

Said surfaces (40) are substantially parallel to the external wings (44).

According to the example shown in FIGS. 5, 6 and 7, said inner surfaces (40) are united with the external wings (44) by two corresponding connecting segments or portions (46) which are made up of the same molding material of which the second element (4) is made: said connecting portions (46) being substantially orthogonal to each surface (40) and to the respective external wing (44). Said connecting portions or segments (46) are on a same side, i.e. they are substantially coplanar, and are at a preset distance from said wall (41), since between each of them and the wall (41) there is a corresponding surface (40).

Each of said surfaces (40), the corresponding external wing and the respective connecting portion (46) cooperate to delimit an opening, which is open upwardly, downwardly and in front of the connecting portion (46), for the threads (3) to be locked.

Furthermore, a teeth (43) is advantageously provided in correspondence of each side surface (40) of said second element (4), that is, in correspondence of the wall facing the cable (2). When the device is in operation, as in FIG. 1 and FIG. 4, the two tooth (43) of the second element (4) clamp the cable (2) which passes between the surfaces (40) from which the tooth (43) emerge.

Furthermore, said surfaces (40) may be provided with respective external tooth (45), each of said tooth facing a respective external wing (44).

The device is assembled as follows.

The cable (2) is made to pass through the appendix (100), the seat (14) of the first element (1) and the gap between the surfaces (40) of the second element (4). Then, the resisting non-conductive threads (3) Are manually disposed to form two side bundles.

Subsequently, each bundle of threads (3) is positioned between a corresponding surface (40) and the respective external wing (44) of the second element (4) and then positioned close to the external side of the same wing, as shown in FIG. 4. Finally, with one hand the first element (1) is pushed towards the second element (4), and with the other hand the cable (2) is pulled in the opposite direction. Therefore, the non-conductive threads (3) are locked within the labyrinth delimited by the first and the second element (1, 4), the second element resulting positioned within the seat (14) provided by the first element. The cable (2) is clamped by the tooth (43) of the second element (4).

The device described above may be equally advantageously used also to lock the end strands of ropes or cords.

Practically, the construction details may vary in any equivalent way as far as the shape, dimensions, elements disposition, nature of the used materials are concerned, without nevertheless departing from the scope of the adopted solution idea and, thereby, remaining within the limits of the protection granted to the present patent for industrial invention.

What is claimed is:

1. A device for looking a plurality of threads, the device comprising:
    a first element provided with a central opening;
    a second element provided with a central opening, said first element and said second element cooperating to delimit a labyrinth passage for the threads to be locked, said second element being provided with two surfaces on opposite sides from each other with respect to the respective central opening and being provided with two external wings each connected to one of said surfaces and said surfaces being connected to each other on a side with a bottom wall of said second element with said surfaces extending from said bottom wall and said external wings extending from said bottom wall, wherein said surfaces of said second element are provided with an inner tooth.

2. A device according to claim 1, wherein said threads are resisting non-conductive threads of an electric cable.

3. A device according to claim 1, wherein said surfaces are each respectively provided with external teeth which face a corresponding external wing of said second element.

4. A device according to claim 1, wherein said threads are threads or strands of a rope or cord.

5. A device for locking a plurality of threads, the device comprising;
    a first element provided with a central opening;
    a second element provided with a central opening, said first element and said second element cooperating to delimit a labyrinth passage for the threads to be locked, said second element being provided with two surfaces on opposite sides from each other with respect to the respective central opening and being provided with two external wings each connected to one of said surfaces and said surfaces being connected to each other on a side with a bottom wall of said second element with said surfaces extending from said bottom wall and said external wings extending from said bottom wall, wherein said threads are resisting non-conductive threads of an electric cable.

6. A device far locking a plurality of threads, the device comprising:
    a first element provided with a central opening;
    a second element provided with a central opening, said first element and said second element cooperating to delimit a labyrinth passage for the threads to be locked, said second element being provided with two surfaces on opposite sides from each other with respect to the respective central opening and being provided with two external wings each connected to one of said surfaces and said surfaces being connected to each other on a side with a bottom wall of said second element with said surfaces extending from said bottom wall and said external wings extending from said bottom wall and wherein when seen in plan view, said second element has a continuous "C" shaped portion with a central connecting portion and two side portions which are on opposite sides with respect to said connecting portion with one side portion extending from said central connecting portion turned 180° with respect to a direction another side portion extends form said central connecting portion, said surfaces being respectively united to respective said wings by corresponding connecting portions with each of said surfaces, the corresponding external wing and the respective connecting portion cooperating to delimit an opening, which is open upwardly, downwardly and in front of the connecting portion for the threads to be locked.

7. A device according to claim 6, wherein each of said surfaces of said second element are provided with a respective inner tooth.

* * * * *